United States Patent
Chang et al.

(10) Patent No.: US 9,005,735 B2
(45) Date of Patent: Apr. 14, 2015

(54) COMPOSITE OF METAL AND RESIN AND MANUFACTURING METHOD THEREOF

(71) Applicants: Hong Fu Jin Precision Industry (ShenZhen) Co., Ltd., Shenzhen (CN); Hon Hai Precision Industry Co., Ltd., New Taipei (TW)

(72) Inventors: Hsin-Pei Chang, New Taipei (TW); Wen-Rong Chen, New Taipei (TW); Huann-Wu Chiang, New Taipei (TW); Cheng-Shi Chen, New Taipei (TW); Hua-Yang Xu, Shenzhen (CN)

(73) Assignees: Hong Fu Jin Precision Industry (ShenZhen) Co., Ltd., Shenzhen (CN); Hon Hai Precision Industry Co., Ltd., New Taipei (TW)

( * ) Notice: Subject to any disclaimer, the term of this patent is extended or adjusted under 35 U.S.C. 154(b) by 0 days.

(21) Appl. No.: 14/097,348

(22) Filed: Dec. 5, 2013

(65) Prior Publication Data

US 2014/0093718 A1    Apr. 3, 2014

Related U.S. Application Data

(63) Continuation of application No. 12/978,617, filed on Dec. 26, 2010, now Pat. No. 8,632,713.

(30) Foreign Application Priority Data

Oct. 13, 2010   (CN) .......................... 2010 1 5055905

(51) Int. Cl.
   *B32B 3/00*    (2006.01)
   *B32B 15/00*   (2006.01)
   (Continued)

(52) U.S. Cl.
   CPC ................ *B32B 15/08* (2013.01); *B32B 27/20* (2013.01); *B32B 27/286* (2013.01); *B32B 3/30* (2013.01); *B32B 3/26* (2013.01); *B29K 2705/10* (2013.01); *B29K 2705/02* (2013.01); *B29C 2045/14327* (2013.01); *B29C 2045/14868* (2013.01);
   (Continued)

(58) Field of Classification Search
   CPC ............ B32B 3/06; B32B 3/30; B32B 15/00; B32B 15/04; B32B 15/08; B32B 15/088; B32B 15/09; B32B 15/18; B32B 15/20; B32B 27/00; B32B 7/04
   USPC .................. 428/161, 164, 457, 458, 137, 131
   See application file for complete search history.

(56) References Cited

U.S. PATENT DOCUMENTS

| 8,192,815 B2 * | 6/2012 | Weber et al. ................. 428/35.8 |
| 8,703,272 B2 * | 4/2014 | Naritomi et al. .............. 428/141 |

FOREIGN PATENT DOCUMENTS

| CN | 101607446 A | 12/2009 |
| WO | WO 2007040245 A1 * | 4/2007 |

OTHER PUBLICATIONS

MeiLi Su, The Incising Technology Based on Laser Processing, Journal of North University of China, Sep. 2007, 122-123, vol. 28.

*Primary Examiner* — Catherine A Simone
(74) *Attorney, Agent, or Firm* — Novak Druce Connolly Bove + Quigg LLP

(57) ABSTRACT

A composite of metal and resin includes a metal piece and a resin piece. The metal piece includes a surface. Micropores are formed on the surface. The micropores have inlet diameters smaller than bottom diameters thereof. The resin piece is partially inserted into the micropores to combine with the metal piece.

5 Claims, 2 Drawing Sheets

(51) Int. Cl.
*B32B 15/04* (2006.01)
*B32B 15/08* (2006.01)
*B32B 27/20* (2006.01)
*B32B 27/28* (2006.01)
*B32B 3/30* (2006.01)
*B32B 3/26* (2006.01)
*B29K 705/10* (2006.01)
*B29K 705/02* (2006.01)
*B29C 45/14* (2006.01)
*B29K 705/00* (2006.01)

(52) U.S. Cl.
CPC ... *B29C2045/14877* (2013.01); *B29K 2705/00* (2013.01); *B32B 2262/101* (2013.01)

COMPOSITE OF METAL AND RESIN AND MANUFACTURING METHOD THEREOF

This application is a divisional application of U.S. Ser. No. 12/978,617, now U.S. Pat. No. 8,632,713, filed Dec. 26, 2010, the contents of which are hereby incorporated by reference. The patent application Ser. No. 12/978,617 in turn claims the benefit of priority under 35 USC 119 from Chinese Patent Application 201010505590.5, filed on Oct. 13, 2010.

BACKGROUND

Technical Field

This disclosure relates to how to manufacture composite of metal and resin.

Integrated metals and synthetic resins are used in a wide range of industrial fields including the production of parts for automobiles, domestic appliances, industrial machinery, and the like. Generally, the metal and the resin are joined together by adhesive. However, this method cannot supply a high-strength composite of metal and resin.

A method of injection joining for manufacturing composites of metal and resin appears to overcome the above shortcoming. In this method, molten resin material is injected onto a metal part that has been inserted in advance into an injection molding mold. The metal part has a surface combined with the resin. Generally, before inserting the metal part in the mold, a surface of the metal is treated by an etchant so that a stronger bond is formed with the resin material. However, different etchants must be used for different metals. In addition, the etchants are strong acids or alkalis, which require special handling when disposing the etchants after use to protect the environment.

Therefore, there is room for improvement within the art.

BRIEF DESCRIPTION OF THE DRAWINGS

Many aspects of the composite of metal and resin can be better understood with reference to the following drawings. The components in the drawings are not necessarily drawn to scale, the emphasis instead being placed upon clearly illustrating the principles of the fastening structure.

DETAILED DESCRIPTION

Figure 1:
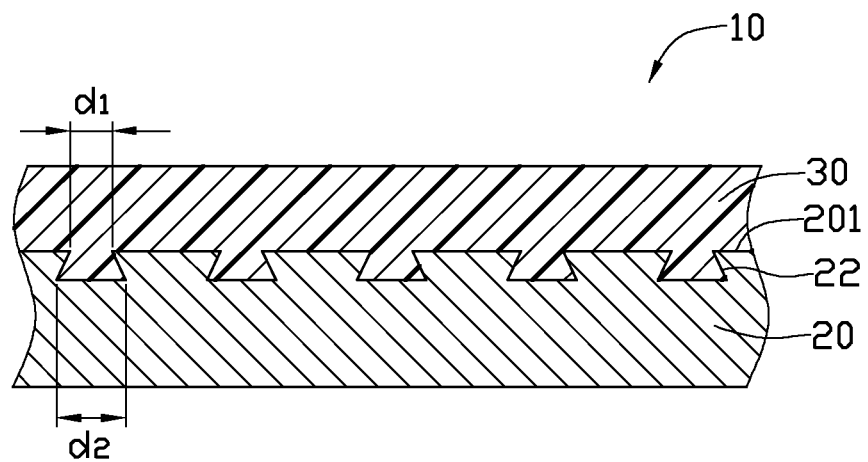
FIG. 1 is a cross section view of a composite of metal and resin, in accordance with an exemplary embodiment.

FIG. 1 shows an exemplary embodiment of a composite 10 of metal and resin. The composite 10 includes a metal piece 20 and a resin piece 30.

The metal piece 20 includes a surface 201 defining a plurality of micropores 22. The micropores 22 are truncated cone shaped. A diameter of the micropore 22 becomes larger with increasing depth from the surface 201. An inlet diameter d1 of the micropore 22 is in a range of 5 μm to 50 μm, and a depth of the micropore 22 is in a range of 25 μm to 300 μm. The material of the metal piece 20 can be selected from the group consisting of aluminum alloy, magnesium alloy, stainless steel alloy, copper and copper alloy.

The resin piece 30 is bonded to the metal piece 20 by inserting molten resin material into a mold holding the metal piece 20, wherein the molten resin material is partially embedded into the micropores 22. The resin material is crystallized-type resin and crystallizes when it is cool. The crystallized-type thermoplastic resin material can be selected from the group consisting of a composite of polyphenylene sulfide and glass fiber, polyamide, polyethylene terephthalate, or polybutylene terephthalate. When using the polyphenylene sulfide and glass fiber composite, the percentage composition of the glass fiber is in a range of 20% to 50%.

A method for manufacturing the above composite 10 includes following steps.

A metal piece 20 is provided. The metal piece can be formed by any process, such as machining or casting.

The metal piece is cleaned with a degreasing agent solution. The metal piece is immersed in the solution having a temperature in an approximate range of 20° C. to 30° C. for 1 minute to 6 minutes. The concentration of degreasing agent contained in the solution is in the approximate range of 90 grams/liter (g/l) to 150 grams/liter (g/l). The metal piece is washed with water after removal from the solution.

Figure 2:
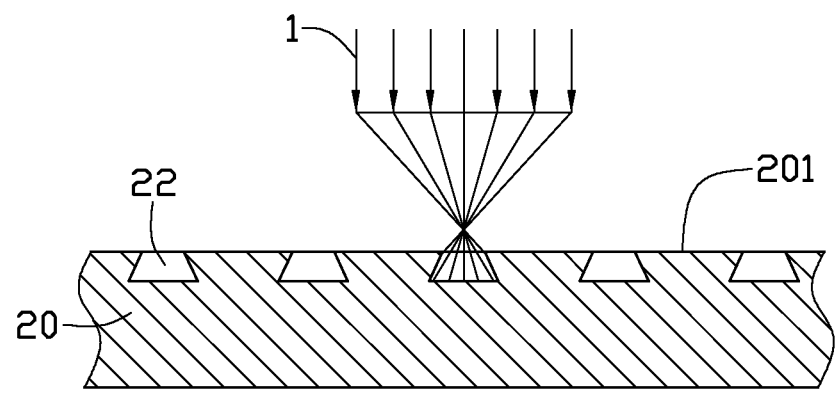
FIG. 2 is a cross section view of the metal piece shown in FIG. 1.

Forming a plurality of micropores 22 by laser beam 1 (referring to FIG. 2) ablating the surface 201 of the metal piece 20, which includes the following steps:

providing a laser beam drilling machine including a controller which controls the ray path of the laser beam 1;

designing a pattern of micropores 22 and inputting the pattern into the controller of the laser beam drilling machine;

adjusting the focal point of the laser beam 1 on the surface 201 of the metal piece 20, and the laser beam 1 ablating the metal piece 20 according to the pattern to form the micropores 22.

Since the focal point of the laser beam 1 is on the surface 201, the laser beam 1 diverges from the focal point after passing the surface 201. Thus, the inlet diameter d1 of the micropore 22 is smaller than a bottom diameter d2 of the micropore 22.

The metal piece is inserted into a mold The metal piece is heated to a temperature in a range of 100° C. to 350° C. The heating can be accomplished using electromagnetic induction.

Molten resin material is injected into the mold and onto the metal piece. The resin material is thermoplastic resin and crystallizes as it cools. The molten resin becomes partially embedded in the micropores and bonds with the metal piece when it is cool. The crystallized-type thermoplastic resin material can be selected from the group consisting of a composite of polyphenylene sulfide and glass fiber, polyamide, polyethylene terephthalate, or polybutylene terephthalate. When using the polyphenylene sulfide and glass fiber composite, the percentage composition of the glass fiber is in a range of 20% to 50%.

Tensile and shear strength tests are applied to the composite of metal and resin made by the above method. The results show that the tensile strength of the composite can reach 10 MPa, and the shear strength of the composite can reach 25 MPa. After repeated cold and hot shock testing for 48 hours at temperatures in a range of −40° C. to 85° C., in 4 hour cycles, the tensile and shear strength of the composite of metal and resin does not become notably weaker.

It is to be understood that even though numerous characteristics and advantages of the present embodiments have been set forth in the foregoing description, together with details of the structures and functions of the embodiments, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A composite of metal and resin comprising:
    a metal piece including a surface, a plurality of micropores formed on the surface, the micropore having an inlet diameter smaller than a bottom diameter thereof, an inlet diameter of the micropore being in a range of 5 μm to 50 μm, and a depth of the micropore being in a range of 25 μm to 300 μm; and
    a resin piece partially inside the micropores and combined with the metal piece.

2. The composite of metal and resin as claimed in claim 1, wherein the material of the metal piece is selected from the group consisting of aluminum alloy, magnesium alloy, stainless steel alloy, copper and copper alloy.

3. The composite of metal and resin as claimed in claim 1, wherein the resin material is thermoplastic resin.

4. The composite of metal and resin as claimed in claim 3, wherein the resin material can be selected from the group consisting of composite of polyphenylene sulfide and glass fiber, polyamide, polyethylene terephthalate or polybutylene terephthalate.

5. The composite of metal and resin as claimed in claim 4, wherein in the composite of polyphenylene sulfide and glass fiber, the percentage composition of the glass fiber is in a range of 20% to 50%.

* * * * *